Patented Oct. 19, 1943

2,332,194

UNITED STATES PATENT OFFICE 2,332,194

RUBBERLIKE COMPOSITION AND PROCESS FOR MAKING THE SAME

Nathan S. Beekley, Jr., Westfield, and William J. Sparks, Cranford, N. J., assignors to Standard Oil Development Company, a corporation of Delaware No Drawing. Application April 29, 1939, Serial No. 270,742

7 Claims. (Cl. 260—5)

This invention relates to rubbery mixtures, and relates particularly to compositions of matter containing a plurality of mixed rubbery substances such as mixtures of isoolefin-diolefin polymer with other rubbery material such as natural rubber and other synthetic rubbers or both.

In the prior art of synthetic polymeric plastics, the great majority of the compositions produced are hard, brittle resins, which are to a limited extent only compatible among themselves and with each other. The number of substances, natural and synthetic, which are both elastic and of high tensile strength is exceedingly limited. Rubber and the limited number of natural substances of the same group are the outstanding examples. In addition, there is a small group of synthetic materials which have an elasticity like rubber; but to the present compositions of matter containing mixtures of the various synthetic polymers, either among themselves or with natural rubber, which show improved properties have not been possible of attainment.

This difficulty of mixing the various natural rubber and synthetic polymer substances is in part due to the widely different responses of the various polymer materials to sulfur, and up to the present it has not been possible to cure a mixture of several of the various polymer materials, because of the different responses to sulfur, and to sulfurization accelerators.

The present invention provides a new composition of matter which can be cured to produce a material having a high tensile strength, a high elasticity, an elastic limit, and the valuable properties of high resistance to chemical substances, toughness, durability and low price, derivable from the good characteristics of the individual materials; and a composition of matter which in addition can be cured or sulfurized.

The present invention provides a new composition having for its basic material a synthetic polymer produced by the polymerization at low temperature of a mixture of an isoolefin and a diolefin such as isobutylene and butadiene, or isobutylene and isoprene, or isobutylene and chloroprene, cyclo pentadiene or ethyl methyl ethylene and butadiene or isoprene or chloroprene, etc., together with natural rubber and its homologues, or synthetic rubbers such as neoprene, which is polychloroprene, Buna, polyethylene, the butadiene-acrylic acid nitrile mixed polymerizates, etc. The invention depends upon the unexpected facts that the isobutylene-butadiene form of synthetic polymer can be cured by a sulfurization procedure and when so cured can be broken down upon the mill and brought into condition for mixing with similarly milled natural rubber or with another polymer, and that thereafter the mixture of cured synthetic polymer and natural rubber can be further cured without the addition of further amounts of sulfur, without over-curing the synthetic polymer and without injury to the natural rubber. There is thereby obtained a new composition of matter made up of a cured mixture of natural rubber and synthetic polymer.

Thus an object of the invention is to compound together a natural rubber and a synthetic polymer and obtain a cure of both the synthetic polymer and the natural rubber without injury to the cure of the other member of the mixture. It is a further object of this invention to incorporate into the mixture a wide range of filler materials, and to mold the mixture into desired shapes. Other objects and details of the invention will be apparent from the following description.

In cracking of crude petroleum to produce from the high boiling hydrocarbons, auxiliary quantities of gasoline boiling range hydrocarbons, it is found that the cracking operation yields about 15% of the weight of the original crude petroleums of gaseous material, including hydrogen, methane and its homologues, ethylene and its homologues, etc. These fixed gases are separable into quantities of substantially pure substances including isobutylene and butadiene. It is found that, by mixing the isobutylene in the proportion of 70 to 90 parts with butadiene in the proportion of 30 to 10 parts, and polymerizing the mixture at temperatures ranging from −50° C. to −150° C. in the presence of a Friedel-Crafts polymerization catalyst of the type of aluminum chloride or boron trifluoride, dissolved in ethyl or methyl chloride, a polymer substance of very high molecular weight is obtainable. The molecular weight is readily brought to values ranging from 50,000 to 250,000 or above; the top limit, if any, being still unknown.

The same polymerization procedure is applicable to mixtures of isobutylene and isoprene, these substances being preferably mixed in the proportion of 90 parts to 99½ parts of isobutylene to 10 parts to ½ part of isoprene. At the same low temperature and with the same catalyst, similar types of polymers are obtained, which have similar characteristics. Similarly, mixtures of isobutylene and chloroprene, or of isobutylene and cyclopentadiene in proportions preferably intermediate between those above given are likewise readily polymerizable to similar elastic polymeric substances.

The resulting polymer product from any of the above, or analogous mixtures and procedures, is readily separated from unpolymerized material, and from diluent-refrigerant substances such as ethylene, and from the catalyst.

The polymer material appears to be a linear, branched-chain, aliphatic hydrocarbon which is substantially or approximately a saturated organic compound having an iodine number ranging from 6 to 15, in contrast to the iodine number of rubber which is in the neighborhood of 350, and in further contrast to the iodine number of pure isobutylene which is approximately 450, and of butadiene which is approximately 900.

The resulting polymer material is white in color and of very much the physical characteristics of crude rubber, being plastic, workable on the mill, elastic, but without an elastic limit. Chemically, however, it is greatly different from the natural rubber, particularly in its low reactivity with oxygen, acid, alkali, etc., and its extremely low solubility in the great majority of the usual solvents. This material is found, however, in spite of its low unsaturation, to be reactive with sulfur to a small but sufficient extent to permit of a curing by heating in the presence of the sulfur. This cure does not, however, appear to be a vulcanization reaction of the type characteristic of rubber, since vulcanization is determined by the unsaturation of the rubber. The polymer substance, however, has been found to absorb approximately 5% of sulfur, some of which appears to be combined by chemical reaction, and other parts of the sulfur may be dissolved or adsorbed. The sulfurization procedure is facilitated by certain sulfur compounds of the type of tetra methyl thiuram disulfide and tetra methyl thiuram monosulfide. This particular substance is a vulcanization accelerator for rubber, but other rubber accelerators of the type of hexamethylene-tetramine and mercapto benzo thiazole are either ineffective or of little utility in promoting the sulfurization of the polymer substance. When compounded with sulfur and heated for a short period of time to complete the cure, the polymer substance shows a tensile strength in the neighborhood of 3500 pounds per square inch, which, of course, has as a corollary an elastic limit, and in addition shows an elongation of from 700% to 1100%.

The cured polymer shows, however, the outstanding difference from rubber that it can be milled and broken down on the mill after curing in substantially the same way in which it could be milled and broken down before curing, and in the way in which uncured rubber can be milled and broken down. This characteristic is in outstanding contrast to rubber which cannot be milled after vulcanization.

The present invention utilizes this characteristic of millability after curing to permit the making of a mixture of the polymer with natural rubber.

In practicing the invention, the polymer may be prepared from the mixture of isobutylene and butadiene as above described, separated from the catalyst, from the diluent-refrigerant, and from unpolymerized materials. The prepared polymer may then be compounded according to the following formula:

| | Parts |
|---|---|
| Copolymer | 100 |
| Sulfur | 2 |
| Zinc oxide | 5 |
| Tuads (tetra methyl thiuram disulfide) | 1 |

This is a basic formula. To it may be added, if desired,

| | Parts |
|---|---|
| Carbon black | 50 |
| Stearic acid | 1 |
| Whiting | 20 |

In preparing this compound, the crude polymer is worked on the mill, which may be the ordinary open roll mill, or may be the Banbury mixer, or may even be the ordinary Werner and Pfleiderer kneading machine, the polymer being milled for a short time until it is well warmed and then the additional compounding substances being added in the usual way. It should be noted that the Tuads, which is the sulfurization agent, should not be added to the compound until the very close of the mixing operation, preferably after the material has been cooled substantially below 100° C., since otherwise a premature cure may occur.

The compounded polymer is then cured by a heat treatment, preferably under pressure, at a temperature of 160° C. for a period of from 15 to 60 minutes. At the close of this curing period, the material has the characteristics of a high grade synthetic rubber, including high tensile strength, high elastic limit, high elongation and excellent flexure resistance.

The cured compound containing the copolymer material is then returned to the open roll mill, and re-milled for the desired breakdown. Simultaneously an appropriate amount of natural rubber, preferably high-grade rubber, is milled upon the open mill rolls until it also is warmed and well broken down. The two are then combined in one of the mills, and milling continued until a thorough incorporation of the rubber and cured copolymer into each other is obtained, care being exercised to keep the milling temperature relatively low in order to prevent premature curing of the mixture.

When the mixing is complete, the mixture may be cured in the usual manner by a heat treatment at a temperature of 125° C. to 165° C., preferably at 145° C., for 15 to 120 minutes.

The following summary of comparative results shows the advantages of this composition:

| | Stock | Curing temp. | Curing time | Elongation | Tensile strength |
|---|---|---|---|---|---|
| | | °C. | Minutes | Per cent | Lbs./sq. in. |
| 2 | Copolymer, 0.5% Tuads (tetra methyl thiuram disulfide) | 155 | 75 | 1,020 | 2,760 |
| 3 | Copolymer, 0.5% ethyl selenac (selenium salt of diethyl dithio carbamate) | 155 | 75 | 1,100 | 2,050 |
| 4 | Copolymer, 1% Tuads (tetra methyl thiuram disulfide) | 155 | 75 | 950 | 3,130 |
| 5 | Copolymer, 1% ethyl selenac (selenium salt of diethyl dithio carbamate) | 155 | 75 | 900 | 2,415 |

The above four items show the physical characteristics of the synthetic polymer material when cured with approximately 2 parts of sulfur according to the above basic formula, using various types of sulfurization aids as indicated.

Under similar conditions rubber shows the following physical characteristics:

| | Stock | Curing temp. | Curing time | Elongation | Tensile strength |
|---|---|---|---|---|---|
| | | °C. | Minutes | Per cent | Lbs./sq. in. |
| 1 | Rubber (Altax or Tuads) | 145 | 30 | 700 | 3,500 |

When mixed in the proportion of 50 parts of crude rubber and 50 parts of the cured polymer, and thereafter further cured as indicated, the following results are obtained:

| Stock | Curing temp. | Curing time | Elongation | Tensile strength |
|---|---|---|---|---|
|  | °C. | Minutes | Per cent | Lbs./sq. in. |
| (1)+(2) | 145 | 15 | 970 | 2,365 |
|  |  | 30 | 850 | 2,085 |
| (1)+(3) | 145 | 15 | 900 | 2,880 |
|  |  | 30 | 840 | 2,280 |
| (1)+(4) | 145 | 15 | 890 | 3,035 |
|  |  | 30 | 910 | 2,730 |
| (1)+(5) | 145 | 15 | 850 | 3,080 |
|  |  | 30 | 810 | 2,770 |

In comparison a mixture of 50 parts rubber and 50 parts of uncured polymer material plus curing ingredients is found to have a maximum tensile strength of 1600 pounds per square inch. Similarly a mixture of 50 parts of rubber with the plain isobutylene polymer known as "Vistanex" or polyisobutylene having a molecular weight range from 50,000 to 250,000, shows a maximum tensile strength of only 700 to 800 pounds per square inch.

It may be noted that the preferred sulfurization accelerator is one of the thiuram compounds since this material produces a satisfactory cure of the isoolefin-diolefin polymer, and when the cured polymer is mixed with the rubber, especially if the rubber contains in addition the requisite amount of sulfur for a proper vulcanization, the thiuram compounds will serve not only as curing agent for the polymeric material but will function in the usual fashion as vulcanization accelerator for the mixed-in rubber. Accordingly, the compounded mixture of polymer and rubber may readily be cured by a further heat treatment after the mixing operation. It may be noted that the time and temperature of the second heat treatment for vulcanizing the rubber is dependent upon the character of the rubber and the nature and quantity of the additional substances compounded into the mixture. It may be noted further that a portion only of the thiuram compound present in the polymer mixture is available for sulfurization accelerator to vulcanize the rubber. Other vulcanization accelerators may be included in the mixture if desired, either by compounding with the polymer before curing of the polymer, in which mixture they are substantially without effect, but show their effectiveness upon mixing with natural rubber, or the vulcanization accelerator may be mixed with the rubber before mixing with the cured polymer, or may be added to the mixture at the close of the mixing operation. The curing aids for the polymer are preferably either Tuads (tetra methyl thiuram disulfide) or Thionex (tetramethyl thiuram monosulfide).

It is found that high-grade material may be produced without the use of stearic acid, and without the use of zinc oxide or other filler.

In the milling operation, the cured copolymer when placed upon the rolls should be milled until it has a "pebbly" appearance which is obtained very shortly after the material on the mill stops falling in small pieces and starts to become a continuous smooth sheet. When this condition is obtained, the milled rubber should be added promptly to the copolymer material since any substantial delay or further milling of the copolymer alone reduces the effectiveness of the results.

The particular properties of the cured polymeric material as above pointed out are especially convenient for the preparation of mixtures of natural rubber and olefinic polymer. Other rubbery materials can, however, be compounded with the olefinic-diolefinic polymer by virtue of some or all of the above-mentioned characteristics.

For instance, some of the synthetic rubber materials such as neoprene are readily cured by heat alone. Satisfactory mixtures of the isoolefin-diolefin polymer are readily prepared by compounding the polymer, preferably in the Banbury mixer as above pointed out, and curing the compounded polymer. The cured polymer is then broken down on the mill as above described whereafter the neoprene may be mixed in, either after warming and breaking down upon another mill, or by direct intermixture. This mixture also is readily cured by a further heat treatment, preferably in moulds.

Similarly, the synthetic rubber known as "Buna" which appears to be produced from diolefinic substance such as butadiene, also may be mixed into the cured copolymer by a similar procedure, and thereafter cured either with or without additional sulfur just as the natural rubber mixture is processed. Similarly, the butadiene-acrylic acid nitrile synthetic rubber and the butadiene-styrene synthetic rubber may likewise be mixed with the compounded polymer and thereafter recured in a manner substantially the same as above disclosed for natural rubber.

The above-described mixtures include with the cured isoolefin-diolefin polymer, natural rubber, or its equivalent synthetic rubber substances which can be vulcanized. The invention is not, however, limited to the vulcanizable synthetic rubber substances as admixtures with the polymer, but other elastic or plastic substances may also be admixed with the polymer. Representative of these substances are polyethylene sulfide (Thiokol) which does not vulcanize with sulfur, but can be cured by heat in the presence of zinc oxide; polyethylene and the polysulphones, which do not vulcanize or cure, but remain permanently thermoplastic; and the polychloroprene known as "Neoprene" which can be cured with heat in the presence of zinc oxide or magnesium oxide. Any of these substances can be mixed with the cured, milled, isoolefin-diolefin polymer by the same procedure above described in connection with rubber, and similar compounds are obtained, differing from each other by small degrees, according to the properties and proportions of the admixed substances.

All of these mixtures may be prepared with the addition only of small amounts of sulfur and the sulfur aid, or they may be mixed with substantial quantities of such substances as zinc oxide, stearic acid, carbon black in its various forms, chromic oxide, ferric oxide, vermilion, wood flour, various siliceous materials, and in fact practically any of the substances which have been suggested as filler materials for natural rubber or the various synthetic rubbers, or the present isoolefin-diolefin polymerizate.

A limited number of the various resins, both natural and synthetic, are also compatible with the cured isoolefin-diolefin polymer. These resins, representative types of which are the cellulose ethers and esters of organic acids, also are readily mixed with the cured polymer by a similar procedure to that above suggested, the cured isoolefin-diolefin polymer being broken down on the mill as above described and the resinous materials, preferably in the powdered form, are then milled into the broken down, cured polymer.

The process of the invention thus produces the composition of matter having highly desirable physical properties, including high elongation ranging up to 1100% or higher, a high tensile strength ranging up to 3500 pounds per square inch or higher, a high abrasion resistance, a high flexure resistance, and a very high resistance to chemical substances such as acids, alkalis, solvents, etc.

While there are above disclosed but a limited number of embodiments of the invention, it is possible to produce still other embodiments without departing from the inventive concept herein disclosed, and is therefore desired that only such limitations be imposed upon the appended claims as are stated or required by the prior art.

The invention claimed is:

1. The process of preparing a composition of matter comprising the steps of polymerizing a mixture of isoolefinic and diolefinic material in the proportion of 70 to 99½ parts of isoolefin with 30 to ½ parts of diolefin at low temperature, compounding the polymer with sulfur and a sulfurization aid, curing the compound, milling the cured compound to plasticity, combining therewith a milled rubber and mixing them to a substantially homogeneous composition.

2. The process of preparing a composition of matter comprising the steps of polymerizing a mixture of isoolefinic and diolefinic material at low temperature, compounding the polymer with sulfur and a sulfurization aid, curing the compound, milling the cured compound to plasticity, combining therewith a milled rubber, mixing them to a substantially homogeneous composition and thereafter curing the mixture.

3. The process of preparing a composition of matter comprising the steps of polymerizing a mixture of isoolefinic and diolefinic material in the proportion of 70 to 99½ parts of isoolefin with 30 to ½ parts of diolefin at low temperature, compounding the polymer with sulfur and a sulfurization aid, curing the compound, milling the cured compound to plasticity, combining therewith a milled rubber and mixing them to a substantially homogeneous composition, and further compounding inert fillers into the mixture.

4. The process of preparing a composition of matter comprising the steps of polymerizing a mixture of a major portion of an iso-olefin and a minor portion of a diolefin at low temperature between $-50°$ C. and $-150°$ C. in the presence of a polymerization catalyst, comprising a Friedel-Crafts catalyst dissolved in a solvent which forms no complex with the Friedel-Crafts catalyst and is liquid at the reaction temperature, compounding the polymer with sulfur and a sulfurization aid, curing the compound, milling the cured compound to plasticity, combining therewith a milled rubber, mixing the polymer and milled rubber to a substantially homogeneous composition and thereafter curing the mixture.

5. The process of preparing a composition of matter according to claim 4, in which the milled rubber is natural rubber.

6. The process of preparing a composition of matter according to claim 4, in which the milled rubber is polybutadiene.

7. The process of preparing a composition of matter according to claim 4, in which the milled rubber is an interpolymer of butadiene and acrylonitrile.

NATHAN S. BEEKLEY, JR.
WILLIAM J. SPARKS.